(12) United States Patent
Shachar

(10) Patent No.: US 12,481,890 B2
(45) Date of Patent: Nov. 25, 2025

(54) SYSTEMS AND METHODS FOR APPLYING SEMI-DISCRETE CALCULUS TO META MACHINE LEARNING

(71) Applicant: NICE Ltd., Ra'anana (IL)

(72) Inventor: Amir Shachar, Haifa (IL)

(73) Assignee: Nice Ltd., Ra'anana (IL)

( * ) Notice: Subject to any disclaimer, the term of this patent is extended or adjusted under 35 U.S.C. 154(b) by 996 days.

(21) Appl. No.: 17/371,348

(22) Filed: Jul. 9, 2021

(65) Prior Publication Data

US 2022/0012309 A1 Jan. 13, 2022

Related U.S. Application Data

(60) Provisional application No. 63/050,224, filed on Jul. 10, 2020.

(51) Int. Cl.
 *G06N 3/084* (2023.01)
(52) U.S. Cl.
 CPC .................................. *G06N 3/084* (2013.01)
(58) Field of Classification Search
 CPC ...................................................... G06N 3/084
 See application file for complete search history.

(56) References Cited

U.S. PATENT DOCUMENTS

2012/0290519 A1* 11/2012 Fontaine ............... G01T 1/2985
 250/252.1
2017/0140269 A1* 5/2017 Schaul .................... G06N 3/08

FOREIGN PATENT DOCUMENTS

CN 107067020 A * 8/2017 ............ G06F 16/51
JP 2020008896 A * 1/2020

(Continued)

OTHER PUBLICATIONS

McCaffrey, "How to Use Resilient Back Propagation to Train Neural Networks", Mar. 9, 2015, Visual Studio Magazine, https://visualstudiomagazine.com/articles/2015/03/01/resilient-back-propagation.aspx (Year: 2015), McCaffrey for wayback machine citation https://web.archive.org/web/20150312171645/https://visualstudiomagazine.com/articles/2015/03/01/resilient-back-propagation.aspx (Year: 2015).*

(Continued)

*Primary Examiner* — Mariela Reyes
*Assistant Examiner* — Alexandria Josephine Miller
(74) *Attorney, Agent, or Firm* — PEARL COHEN ZEDEK LATZER BARATZ LLP

(57) ABSTRACT

A method and system for building and implementing a meta-machine learning (meta-ML) optimization engine for a neural network (NN) or a machine learning (ML) connective model. A computer processor may iteratively simulate a backpropagation algorithm by executing a sequence of optimization steps. At each optimization step a position of a loss function may be determined that may be closer than a previously determined position of the loss function to a local minimum. A computer processor may compute and store after each iteration a detachment of the loss function, learning rate, and optimal learning rate. A computer processor may train a machine learning connective model to model the optimal learning rates of the simulated backpropagation algorithm. The meta-ML optimization engine may be implemented for a NN or ML connective model by generating a modified backpropagation algorithm in which algorithmic features of gradient descent may be replaced by the meta-ML optimization engine.

22 Claims, 6 Drawing Sheets

(56) References Cited

FOREIGN PATENT DOCUMENTS

| WO | WO-2020090947 A1 * | 5/2020 | |
|---|---|---|---|
| WO | WO-2020147461 A1 * | 7/2020 | ............ G06F 30/20 |

OTHER PUBLICATIONS

Finkelstein, "Introduction To Semi-discrete Calculus A Theory Behind The Integral Image Algorithm", Apr. 2, 2011 (Year: 2011).*
Andrychowicz, Marcin, et al. "Learning to learn by gradient descent by gradient descent." *Advances in neural information processing systems*. Nov. 30, 2016.
Behnke, Sven. *Hierarchical neural networks for image interpretation*. vol. 2766. Springer, Jun. 13, 2003.
Byrne, Jeffrey. "Nested motion descriptors." *Proceedings of the IEEE conference on computer vision and pattern recognition*. 2015.
Chen, Zhixiang, et al. "Deep hashing via discrepancy minimization." *Proceedings of the IEEE Conference on Computer Vision and Pattern Recognition*. 2018.
Chen, Tiangi, and Carlos Guestrin. "Xgboost: A scalable tree boosting system." *Proceedings of the 22nd acm sigkdd international conference on knowledge discovery and data mining*. Aug. 13, 2016.
Daniel, Christian, Jonathan Taylor, and Sebastian Nowozin. "Learning step size controllers for robust neural network training." *Thirtieth AAAI Conference on Artificial Intelligence*. Feb. 21, 2016.
Finkelstein, Amir. "On Semi-discrete Operators: Theoretical Aspects of the Integral Image Algorithm." Apr. 2, 2011.
Gallardo, Mathias, et al. "Shape-from-template in flatland." *Proceedings of the IEEE Conference on Computer Vision and Pattern Recognition*. 2015.
Ganin, Yaroslav, and Victor Lempitsky. "Unsupervised domain adaptation by backpropagation." *International conference on machine learning*. PMLR, Feb. 27, 2015.
Goodfellow, Ian J., Jonathon Shlens, and Christian Szegedy. "Explaining and harnessing adversarial examples." arXiv preprint arXiv:1412.6572; Mar. 2, 2015.
Hochreiter, Sepp, A. Steven Younger, and Peter R. Conwell. "Learning to learn using gradient descent." *International Conference on Artificial Neural Networks*. Springer, Berlin, Heidelberg, Aug. 17, 2001.
Hu, Zhe, et al. "Deblurring low-light images with light streaks." *Proceedings of the IEEE Conference on Computer Vision and Pattern Recognition*. 2014.
Kong, Xiangyu, et al. "Collaborative deep reinforcement learning for joint object search." *Proceedings of the IEEE Conference on Computer Vision and Pattern Recognition*. Feb. 17, 2017.
Kurakin, Alexey, Ian Goodfellow, and Samy Bengio. "Adversarial examples in the physical world." Jul. 8, 2016.
Lafond, Jean, Hoi-To Wai, and Eric Moulines. "On the online Frank-Wolfe algorithms for convex and non-convex optimizations." arXiv preprint arXiv:1510.01171; Aug. 15, 2016.
Seok Lee, Hee, and Kuoung Mu Lee. "Simultaneous super-resolution of depth and images using a single camera." *Proceedings of the IEEE Conference on Computer Vision and Pattern Recognition*. 2013.
Li, Debang, et al. "A2-RL: Aesthetics aware reinforcement learning for image cropping." *Proceedings of the IEEE Conference on Computer Vision and Pattern Recognition*. Mar. 12, 2018.
Liu, Li, et al. "Discretely coding semantic rank orders for supervised image hashing." *Proceedings of the IEEE conference on computer vision and pattern recognition*. 2017.
Lovasz, Laszlo. "One mathematics." *Mitteilungen der Deutschen Mathematiker-Vereinigung* 6.2 (published Apr. 18, 2014): 33-39.
Moosavi-Dezfooli, Seyed-Mohsen, et al. "Robustness via curvature regularization, and vice versa." *Proceedings of the IEEE/CVF Conference on Computer Vision and Pattern Recognition*. 2019.
Moosavi-Dezfooli, Seyed-Mohsen, Alhussein Fawzi, and Pascal Frossard. "Deepfool: a simple and accurate method to fool deep neural networks." *Proceedings of the IEEE conference on computer vision and pattern recognition*. 2016.
Mousavi, All, Arian Maleki, and Richard G. Baraniuk. "Consistent parameter estimation for LASSO and approximate message passing." *The Annals of Statistics* 46.1 (Feb. 2018): 119-148.
Navalpakkam, Vidhya, and Laurent Itti. "Optimal cue selection strategy." *Advances in neural information processing systems* 18 (2005).
Pan, Jinshan, et al. "Robust kernel estimation with outliers handling for image deblurring." *Proceedings of the IEEE Conference on Computer Vision and Pattern Recognition*. 2016.
Ramdas, Aaditya, and Aarti Singh. "Algorithmic connections between active learning and stochastic convex optimization." *International Conference on Algorithmic Learning Theory*. Springer, Berlin, Heidelberg, May 15, 2015.
Redi, Miriam, et al. "6 seconds of sound and vision: Creativity in micro-videos." *Proceedings of the IEEE Conference on Computer Vision and Pattern Recognition*. Nov. 14, 2014.
Shachar, Amir. "Applying Semi-discrete Operators To Calculus." arXiv preprint arXiv:1012.5751 (Jun. 2, 2014).
Schmidhuber, Jürgen. "Learning to control fast-weight memories: An alternative to dynamic recurrent networks." *Neural Computation* 4.1 (Jan. 1, 1992): 131-139.
Silva, Michel, et al. "A weighted sparse sampling and smoothing frame transition approach for semantic fast-forward first-person videos." *Proceedings of the IEEE Conference on Computer Vision and Pattern Recognition*. 2018.
Sommer, Johanna, Dimitrios Sarigiannis, and Thomas Parnell. "Learning to Tune XGBoost with XGBoost." arXiv preprint arXiv:1909.07218 (Nov. 21, 2019).
Sportisse, Aude, et al. "Debiasing Averaged Stochastic Gradient Descent to handle missing values." *Advances in Neural Information Processing Systems* 33 (Jun. 8, 2020).
Tang, Yansong, et al. "Deep progressive reinforcement learning for skeleton-based action recognition." *Proceedings of the IEEE Conference on Computer Vision and Pattern Recognition*. 2018.
Thrun, Sebastian, and Lorien Pratt. "Learning to learn: Introduction and overview." *Learning to learn*. Springer, Boston, MA, Mar. 17, 1998.
Tron, Roberto, and Kostas Daniilidis. "On the quotient representation for the essential manifold." *Proceedings of the IEEE Conference on Computer Vision and Pattern Recognition*. 2014.
Viola, Paul, and Michael Jones. "Rapid object detection using a boosted cascade of simple features." *Proceedings of the 2001 IEEE computer society conference on computer vision and pattern recognition*. CVPR 2001. vol. 1. Ieee, 2001.
Wang, Hachan, and Bhiksha Raj. "On the origin of deep learning." arXiv preprint arXiv:1702.07800 (Mar. 3, 2017).
Wang, Xiaogang, et al. "Shape and appearance context modeling." *2007 IEEE 11th international conference on computer vision*. Ieee, 2007.
Li, Wei, and Xiaogang Wang. "Locally aligned feature transforms across views." *Proceedings of the IEEE conference on computer vision and pattern recognition*. 2013.
Zhai, Shaodan, et al. "Direct 0-1 loss minimization and margin maximization with boosting." *Advances in Neural Information Processing Systems* 26 (2013): 872-880.
Zhu, Yu, et al. "Modeling deformable gradient compositions for single-image super-resolution." *Proceedings of the IEEE Conference on Computer Vision and Pattern Recognition*. 2015.

* cited by examiner

SYSTEMS AND METHODS FOR APPLYING SEMI-DISCRETE CALCULUS TO META MACHINE LEARNING

RELATED APPLICATION DATA

This application claims benefit from U.S. provisional patent application 63/050,224 filed on Jul. 10, 2020, and entitled "SYSTEM AND METHOD FOR APPLYING SEMI-DISCRETE CALCULUS TO INCREMENTAL META MACHINE LEARNING", incorporated herein by reference in its entirety.

FIELD OF THE INVENTION

The present invention generally relates to neural networks, meta-machine learning, and artificial intelligence computer systems, specifically to an improved training method.

BACKGROUND OF THE INVENTION

Neural networks (NN) and/or connectionist systems (e.g., eXtreme gradient boosting (XGBoost)) are computing systems inspired by biological computing systems but operating using manufactured digital computing technology. NNs are made up of computing units typically called neurons (which are artificial neurons, as opposed to biological neurons) communicating with each other via connections, links, or edges. Neurons may be termed nodes; however, nodes may also be used in NN terminology to refer to the machines that execute a virtualized NN. In typical NN implementations, the signal at the link between artificial neurons may be, for example, a real number, and the output of each neuron may be computed by a function of the (typically weighted) sum of its inputs, such as the ReLU rectifier function. NN links or edges usually have a weight that adjusts as learning proceeds. The weight increases or decreases the strength of the signal at a connection. Typically, NN neurons are divided or arranged into layers. Different layers may perform various kinds of transformations on their inputs and may have different connections with other layers. Typically, a higher or upper layer, or a layer "above" another layer, is more towards the output layer. A lower layer, preceding layer, or a layer "below" another layer, is a layer towards the input layer.

Connectionist systems such as XGBoost are made up of computing units typically called nodes. These communicate with each other via connections, commonly known as branches. The nodes and branches together comprise decision trees that may also be connected by branches and executed iteratively in sequence. The system may learn from previous iterations to perform computations more accurately. XGBoost may be considered analogous to NN. A signal at the branch between sequential decision trees may be a real number, and the output of each node may be computed by a function of the (typically weighted) sum of its inputs. Further analogous to NN, branches usually have a weight that adjusts as learning proceeds such that the weight increases or decreases the strength of the signal at a connection.

Such systems may use machine learning (ML) optimization algorithms to train an analytical model that may perform analysis on example input data. Training of an analytical model is typically conducted within a meta-ML framework. The analytical model, generally without being programmed with any analysis-specific rules, may be presented with the correct output for the data, may self-correct, and in essence, learn how to learn. For example, a NN in training a model may execute a forward-backward pass wherein the forward pass the system is presented with an input and produces an output. In the backward pass (e.g., backpropagation), the system is given the correct outcome and generates an error function (e.g., a loss function). As provided by ML optimization algorithms such as gradient descent, the system may then create update gradients of a loss function which are used to alter the weights at the links or edges such that the loss function may be optimized (e.g., minimized).

In numerous ML optimization problems, the loss function may encounter anomalies during a model's training, such as discontinuity, non-differentiability, and/or over-oscillating near some points, or the input data itself may incur missing values. Example scenarios in which input data may incur missing values can be a corruption of numerical data input and/or failure to record numerical data. The latter scenario, however, typically does not occur in many fields. For example, these anomalies of the loss function and missing input data may typically present themselves within the financial domain; attributable to business constraints and the discrete nature of features and optimization metrics that may dictate relations and distance metrics between features that are not necessarily smooth continuous analytical functions. These anomalies of the loss function may also present themselves in other domains such as military and scientific domains. In turn, gradient descent, which optimizes the loss function in many NN systems, may typically be limited to loss functions that are differentiable and continuous and/or suboptimal curative practices which are outlined in the next two paragraphs.

In the case of missing input data, a common curative practice may be to perform a manual step of inputting missing data values, which typically introduces erroneous data and reduces the accuracy of the optimization of the loss function. Another common curative practice, in the case of discontinuous and/or non-differentiable points of a loss function, may be to approximate the derivative at the anomalous points of the loss function with the "numeric derivative", which may simply be the calculation of the secant near that point. Proceeding in the direction of the secant near one of the afore-mentioned anomalies, however, may divert from the optimal route to the optimum point of the loss function, and in turn may instead result in the convergence to a local non-optimum point and thus adversely affect the accuracy of the optimization of the loss function. Additionally, this practice may delay the optimization procedure resulting in an overabundance of computations and a corresponding decrease in computational efficiency.

Common optimization methods that may address non-differentiable loss functions and limitations thereof may include:

Coordinate Descent, in which the optimization may be conducted based on a single variable that is being changed or optimized while the rest of the variables are held fixed. The main problem with this approach may be that in the case of having a non-smooth multivariable loss function the optimization may get stuck. Further, this method may not address discontinuous loss functions.

Gradient Descent, Conjugate Gradient, and Stochastic Gradient Descent, may all work under some conditions for sub-differentiable functions (not only for differentiable ones). But as stated above, methods that utilize gradient descent may be sub-optimal in the case of afore-mentioned anomalies.

Numeric derivative combined with other optimization methods. But as stated above, methods that utilize numeric derivative may be sub-optimal in the case of missing input data values.

Problems inherent in the art may limit those skilled in the art to loss functions that adhere to continuous and differentiable math and/or avoid oscillations and lead to sub-optimal models and practices that render the optimization process challenging, inaccurate, and inefficient. Accordingly, there is a long-felt need in the art for ML systems and methods that render optimization suitable for non-differentiable and discontinuous loss functions, including oscillating functions and in cases of missing values in the data.

SUMMARY

Embodiments of the invention solve this long-felt need in the art by providing a meta-ML optimization engine that may be built and implemented for a NN and/or ML connective model. The meta-ML optimization engine may enable optimization of non-differentiable, discontinuous, and/or oscillatory loss functions that may correspond to data sets with missing values while avoiding the use of suboptimal curative methods for such anomalies. This may be achieved by iteratively simulating a variant of a trend-based backpropagation algorithm in which the semi-discrete calculus detachment operator may be used in place of the sign of the derivative to compute trends of a loss function and determine optimal points of the loss function. Embodiments may optimize this simulation by recasting it in a meta-ML environment in which a ML connective model may effectively build the meta-ML optimization engine by learning the learning rate of the simulation.

In an embodiment of the invention, a method and system are provided for building a meta-ML optimization engine for a NN and/or a ML connective model. A computer processor may compute the local minima of a loss function for a data set. A computer processor may store a detachment of the loss function at a selected position of a parameter. A computer processor may iteratively simulate a backpropagation algorithm by executing a sequence of optimization steps. According to some embodiments, the backpropagation algorithm may be a variant of RProp that uses a detachment operator in place of a derivative operator. At each iteration, an optimization step may be configured to determine a position of a parameter of the loss function that may be closer than the selected position of the parameter of the loss function or a previous position of the parameter of the loss function determined in a previous iteration to a local minimum of the loss function. A computer processor may compute each iteration a detachment of the loss function and learning rate at the position of a determined parameter of the loss function. A computer processor may compute at each iteration one or more optimal learning rates. An optimal learning rate may comprise an absolute value of a difference between the position of a determined parameter of the loss function and the position of a local minimum of the loss function. A computer processor may store after each iteration the computed detachment, learning rate, and optimal learning rates. A computer processor may train a ML connective model to model the optimal learning rates of the backpropagation algorithm.

In an embodiment a method and system are provided for implementing a meta-ML optimization engine for a NN and/or a ML connective model. A computer processor may receive raw training data and raw data from a database. A computer processor may generate training data and data by preparing the raw training data and the raw data, respectively. A computer processor may generate a modified backpropagation algorithm by replacing algorithmic traits of gradient descent in a backpropagation algorithm that may use gradient descent with the meta-ML optimization engine. A computer processor may train the NN and/or ML connective model using the training data and the modified backpropagation algorithm. A computer processor may apply the trained NN and/or ML connective model to the data.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments are illustrated without limitation in the figures, in which like reference numerals indicate corresponding, analogous or similar elements, and in which:

Figure 1:
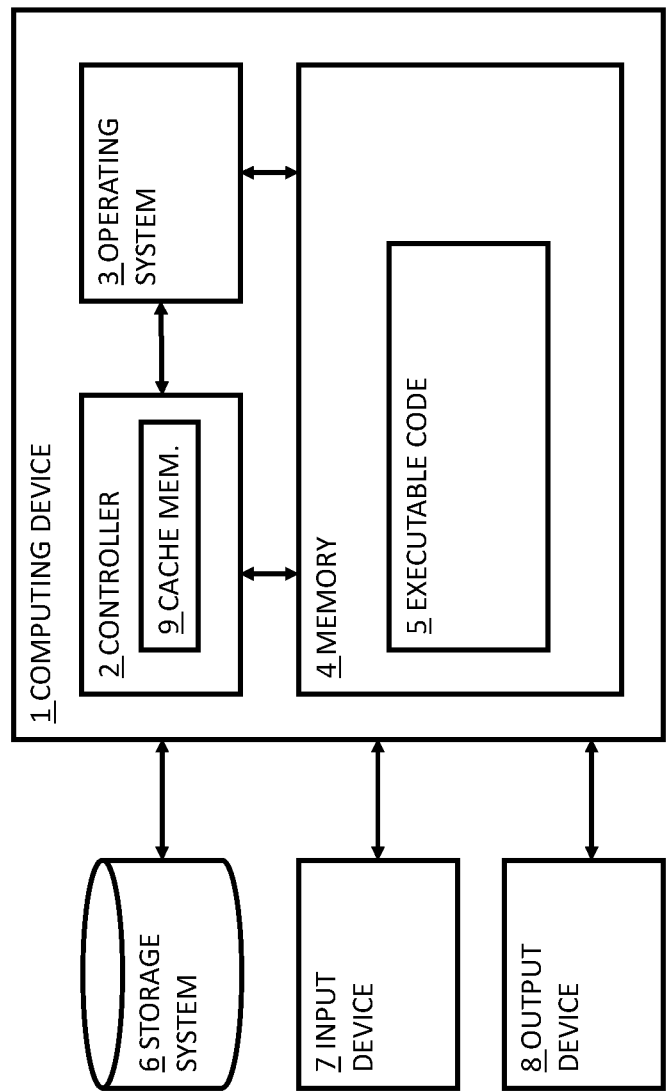
FIG. 1 is a block diagram depicting a computing device, which may be included within an embodiment of a system for executing neural networks and/or ML connective systems, according to some embodiments.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

One skilled in the art will realize the invention may be embodied in other specific forms without departing from the spirit or essential characteristics thereof. The embodiments are therefore to be considered in all respects illustrative rather than limiting of the invention described herein. Scope of the invention is thus indicated by the appended claims, rather than by the description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

ML products typically involve discontinuous and/or non-differentiable optimization, meaning such whose custom loss function involves discontinuities or points where a loss function's derivative may be undefined and/or missing data. For example, discontinuities and/or missing data may occur more often than not in the financial domain due to business constraints and the discrete nature of features and optimization metrics. Embodiments of the invention encapsulate meta machine (meta-ML) learning, the practical use of calculus in ML, and artificial intelligence.

Embodiments of the invention provide a meta-ML optimization engine for a NN and/or a ML connective system that may allow for accurate and efficient optimization of non-differentiable, discontinuous, and/or oscillating loss functions and/or loss functions that may describe datasets with missing data values. Embodiments include a meta-ML optimization engine that may leverage a NN and/or ML connectionist system (e.g., XGBoost) by utilizing a semi-discrete detachment operator on a loss function rather than a derivative operator.

The detachment of a function (e.g., a loss function) is a mathematical operator that may compute the momentary trend or monotony of any function, and particularly a loss function. Monotony may be understood as the indication of whether or not a function may be non-increasing or non-decreasing. For example, a function, over an interval, may be considered to monotonically increase over the interval if the function may be non-decreasing over the interval. The detachment may be more robust than the derivative as it may sufficiently characterizes oscillations, unstable slopes and curvatures throughout the optimization process and be defined at discontinuous and/or non-differentiable positions of a parameter(s) of a loss function. Loss functions may be defined in a subset of a finite-dimensional Euclidean space which may comprise possible parameters that may describe a mathematical model. The position(s) of a parameter of a loss function may be understood as, for example, that parameter's value(s) with respect to the loss function. For example, a loss function which may include a single parameter may be graphically displayed such that positions of the single parameter may lie along the x axis and values of the loss function which may correspond to the evaluation of the loss function with respect to positions of the single parameter may lie on the y axis.

An example detachment definition may be:

$$f_{\pm}^{\cdot} : \mathbb{R} \to \{0, +1, -1\} \quad (1)$$

$$f_{\pm}^{\cdot}(x_0) \equiv \pm \lim_{x \to x_0^{\pm}} \text{sgn}[f(x) - f(x_0)]$$

Where, $f$ may represent any optimized function (e.g., loss function), x may represent a parameter in a parameter space (e.g., the weights of a NN) which may be understood as an independent variable, $x_0$ may represent a specific position (e.g., value) of the parameter in the parameter space, and $\mathbb{R}$ may represent the set of real numbers wherein those numbers may be 0, +1, or −1, and $f_{\pm}^{\cdot}$ may represent the detachment of the loss function at $x_0$. An example procedure by which a detachment of a function $f$ at $x_0$ may be calculated in a continuous domain may include, for example:

1) Calculating a sign of the difference between a value of the function $f$ at $x_0$ and neighboring values of the function $f$ at neighboring positions of the parameter.
2) Applying a limit process to the calculation made in step 1) and if the limit exists, a number in $\mathbb{R} \to \{0, +1, -1\}$ may be output.

An example procedure by which a detachment of a function $f$ at $x_0$ may be calculated in a discrete domain may include, for example:

1) Taking the numerical approximation of the continuous definition of $f$.
2) Picking a point in proximity with $x_0$ (e.g., $x_0$+epsilon).
3) Calculating a sign of the difference between a value of the function $f$ at $x_0$ and the function $f$ at $x_0$+epsilon.
4) Applying a limit process to the calculation made in step 3) and if the limit exists, a number in $\mathbb{R} \to \{0, +1, -1\}$ may be output.

Typically, backpropagation algorithms (e.g., RProp) may use the sign of the derivative of a loss function such that the momentary trend of the loss function may be deduced and minimums of the loss function may be captured, accordingly, optimizing the loss function. This approach, however, can be limiting as computing a sign of the derivative of a loss function includes the intermediate computation of the derivative and thus thereby may be dependent on the derivative existing and/or being defined over a range of the loss function. A loss function's detachment, on the other hand, may overcome this limitation as the computation of a detachment of a loss function may not include the intermediate computation of the derivative of the loss function. Further, the use of a detachment may improve computational efficiency as it may avoid computing the derivative all together. Thus, a loss function may be better defined based on detachments, rather than the sign of the derivative. The detachment may yield a simpler approach to classify trend of a loss function and thus may be suitable for the aforementioned anomalies.

According to some embodiments, a backpropagation algorithm that computes the sign of the derivative of a loss function such as RProp may be iteratively simulated over a loss function of a dataset. The backpropagation algorithm may be a simulated such that it may be a variant of RProp in which the detachment of the loss function may be computed in place of the sign of the derivative of the loss function. Embodiments of the invention may use the sign of the difference between the loss function's values in consecutive invocations of the iteratively simulated backpropagation algorithm according to example detachment equation (1) or other detachments as predictor values and a learning rate as an explained variable (e.g., dependent variable) and the detachments as an explaining variable (e.g., independent variable). An explained variable may be understood as the variable that responds to changes in the explaining variable. For example, sequences of detachments that may indicate close proximity to a local minimum of a loss function such as those that show frequently changing values (e.g., $\{-1, +1, -1, +1\}$) may result in a reduced explained variable as in such a scenario smaller learning rates may capture the local minimum more efficiently than larger ones.

The iteratively simulated backpropagation algorithm may use detachments computed as per equation (1) to learn how to capture local minima of a loss function so as to produce a variant of the backpropagation algorithm RProp that uses detachments in lieu of signs of derivatives to capture local minima of a loss function. Accordingly, local minima of the loss function otherwise overlooked by conventional ML optimization algorithms may be captured by the iterative simulation of the backpropagation algorithm by the execution of a sequence of optimization steps; one for each iteration. At each optimization step, the position or value of a parameter of the loss function may be determined that may be closer than a position of the parameter determined in a previous iteration to a local minimum of the loss function. Further, embodiments of the invention may accumulate meta-data in each iteration by computing at each optimization step one or more optimal learning rates; an optimal learning rate may be an absolute value of a difference between the position of a parameter of the loss function and the position of a local minimum of the loss function.

Embodiments of the invention may avoid derivatives of the loss function and thereby may not be limited to loss functions that may be differentiable, non-oscillatory and/or continuous and/or datasets without missing values. Further, in utilizing loss functions that may be non-differentiable, oscillatory and/or discontinuous and/or datasets with missing values aforementioned suboptimal correction methods may be avoided which may, in turn, provide improved accuracy of the optimization of a loss function. Embodiments of the invention may provide improved computational efficiency as the detachment of the loss function may not be subject to overflow due to the computation of the detachment not including division by a small number as in the definition of the derivative. Accordingly, other numerical issues that typically characterize the gradient, such as the gradient explosion issue, may also be spared by using the detachment operator to calculate the trend of a loss function directly.

Embodiments of the invention may build a meta-ML optimization engine by training a ML connective model such as XGBoost to model the optimal learning rates of the iteratively simulated trend-based backpropagation model. Embodiments of the invention may use meta-ML with generic parametrization as opposed to hyperparameter optimization (HPO meta-optimization). Accordingly, the ML connective system may take as input an explained variable (e.g., dependent variable) that may be the previously computed optimal learning rates and an explaining variable (e.g., independent variable) which may be the respective previously computed detachments.

Embodiments of the invention may use feature engineering applied to sequences of detachment values such as different aggregated sequences of detachments values as features of the ML connective model. For example, consecutive identical detachments may be collected or arranged into respective features as, for example, tuples. A tuple may be for example a row of numbers (e.g., $\{+1, +1, +1\}$, $\{-1, -1, -1, -1\}$). This may reduce the number of features, alleviate the curse of dimensionality, and simplify the model and in turn mitigate overfitting and hence improve computational efficiency. Collection of consecutive identical detachments may enable an automatic control for exploration or exploitation of the explained variable. For example, if the most recent detachment tuples (e.g., $\{+1, +1, +1, +1\}$, $\{-1, -1, -1, -1, -1\}$, $\{+1, +1, +1, +1\}$) have a dimension greater than or equal to some threshold (e.g., 4) the explained variable may be explored by making liberal adjustments to the explained variable. On the other hand, if the most recent detachment tuples (e.g., $\{-1, -1\}$, $\{+1\}$, $\{-1, -1\}$) have a dimension less than some threshold (e.g., 3) the explained variable may be exploited by making conservative adjustments to the explained variable. This embodiment may, in effect, simulate long short-term memory (LSTM) (e.g., an artificial recurrent NN) while using the ML connective model XGBoost.

According to some embodiments, meta learning of the ML connective model may be conducted in an incremental fashion. For example, initial meta-data accumulated in initial iterations of the iteratively simulated backpropagation algorithm may initiate before termination of the iteratively simulated backpropagation algorithm the training of the ML connective model and accordingly the learning rate of the ML connective model may be updated. Then, the learning rate of the ML connective model may repeatedly be updated based on incremental batches. According to some embodiments, the learning rate of the ML connective model may be repeatedly updated relatively frequently (e.g., millions of times a second) such that updating may be understood as to be performed in essentially continuous manner.

According to some embodiments of the invention, after training of the meta-ML optimization engine, the meta-ML optimization engine may be implemented for a NN and/or connective ML model. Accordingly, an optimization algorithm that uses gradient descent may be modified by replacing algorithmic traits of gradient descent with the meta-ML optimization engine (e.g., modifying section of a code that calls gradient descent to instead call the previously built meta-ML optimization engine). An optimization algorithm may have algorithmic traits of gradient descent that use analytical differentiation that may be used on an analytical loss function and algorithmic traits of gradient descent that use numerical differentiation that may be used on a numerical loss function. According to some embodiments, the algorithmic traits of gradient descent to be replaced may be limited to those that only use numerical differentiation. Numerical differentiation may compute a derivative of a loss function using local values of the loss function and may provide improved and/or more versatile computational performance. On the other hand, analytical differentiation uses a general loss function expression which often may not be available and/or inaccurate due to, for example, missing input data. Further, analytical differentiation comprises two primary steps of computing the derivative and then evaluating it to get a result whereas numerical differentiation computes the derivative and gets a result in one step.

The modified optimization algorithm may then be used to train a NN and/or ML connective model; revisiting the process of gradient descent while overlooking a gradients magnitude and focusing on a loss function's trends. Accordingly, embodiments of the invention may render optimization suitable for non-differentiable and discontinuous loss functions, including oscillating functions and cases of missing values in the input data. In embodiments where the ML connectionist model used to construct the meta-ML optimization engine may be XGBoost, automatic imputation of missing data values may be implemented in any ML optimization algorithm. Accordingly, embodiments may be used to make any ML algorithm or any optimization algorithm more robust to different loss function's anomalies, curves and curvatures, and enable them to cope with missing values automatically and hence be more computationally efficient.

According to some embodiments, a NN and/or ML connective system trained according to methods discussed herein may be applied to a data set to detect financial fraud and produce an output such as an alert (e.g., an automated phone or text message alerting a victim of financial fraud). For example, a data set to be analyzed by a trained NN and/or ML connective system may describe financial transactions with corresponding parameters such as transaction amounts, GPS locations of transactions, and transaction trends. Embodiments of the invention may improve analysis of data sets that contain missing data inputs or with corresponding non-differentiable, discontinuous, and/or oscillatory loss functions as aforementioned may typically be the case with regard to data sets belonging to the financial domain.

A first example method that constructs a meta-ML optimization engine may be performed by a computer processor such as a system shown in FIG. 1 and may include, for example:

1) Initializing an empty data frame. According to some embodiments, the data frame may comprise an initially empty table of n rows and q columns (e.g., Pandas Dataframe) where n may be the number of iterations to be performed by a backpropagation simulation and q may be the number of variables to be computed in a single iteration of a backpropagation simulation.

2) Computing minima over a loss function of a dataset. According to some embodiments, minima of the loss function may be computed by an optimization method and/or brute force.

3) Computing and storing in a data frame the detachment of a selected position of a parameter of the loss function. As mentioned, the position(s) of a parameter of a loss function may be understood, for example, as that parameter's value(s) with respect to the loss function. Accordingly, a selected position of a parameter of the loss function may include a selected value of a parameter of the loss function. According to some embodiments, the selected position of a parameter of the loss function may be selected randomly by a Monte Carlo method. According to some embodiments, the position of a parameter of the loss function may be selected manually and/or other methods of selection.

4) Iteratively simulating a backpropagation that may be a variant of RProp wherein a detachment operator is used in place of a derivative and follows, for example, the following example equation:

$$\omega_i^{(t)} = \omega_i^{(t-1)} - \varepsilon_i^{(t-1)} \cdot E_{t-1}; \qquad (2)$$

Where with $\omega_i^{(t)}$ may represent the ith parameter of the loss function in the tth iteration, $\omega_i^{(t-1)}$ may represent the ith parameter of the loss function in the t-1th iteration, $\varepsilon_i^{(t-1)}$ may represent the learning rate of ith parameter of the loss function in the t-1th iteration, and $E_{t-1};$ may represent the detachment of the loss function with respect to the ith parameter $E_{t-1}(\omega_i^{(t-1)})$ in the t-1th iteration. At each iteration, the t-1th parameter $\omega_i^{(t-1)}$ may be reduced by the t-1th learning rate times the t-1th detachment of the loss function such that with each tth iteration a parameter of the loss function that may be closer to a local minimum of the loss function than a parameter computed in a previous iteration may be determined; in equation (2) that determined parameter may be $\omega_i^{(t)}$. Distance between a parameter and the minimum of a loss function (to determine if a position or parameter is closer) may for example be a Euclidean distance. In one embodiment a distance may be computed by the absolute value of the difference between the position (e.g. value) of the parameter and the position of a parameter that corresponds to a local minimum of the loss function. For example, $\omega_i^{(t)}$ may be considered closer to a local minimum than $\omega_i^{(t-1)}$ if the absolute value of the difference between the position of $\omega_i^{(t)}$ and the position of a parameter that corresponds to a local minimum is less than the absolute value of the difference between the position of $\omega_i^{(t-1)}$ and the position of a parameter that corresponds to the same local minimum. In some sense, the distance between parameters may be a function of their values (e.g. positions). For example, a loss function which may include an ith parameter may be graphically displayed such that positions of the ith parameter such as those determined in subsequent iterations of the simulated backpropagation algorithm may lie along the x axis and values of the loss function which may correspond to the evaluation of the loss function with respect to positions of the ith parameter may lie on the y axis. A distance between two parameters may be the difference between their positions along the x axis. Accordingly, this may be understood as an optimization step that together with other optimization steps of other iterations may comprise a sequence of optimization steps. According to some embodiments, the iteratively simulated backpropagation algorithm may be performed by a Monte Carlo method.

5) Computing and storing in the data frame after each iteration the detachment and the learning rate. Additionally, computing and storing in the data frame one or more optimal learning rates where an optimal learning rate may be an absolute value of the difference between the position of the determined ith parameter of the of the loss function in the tth iteration $\omega_i^{(t)}$ and the position of a local minimum of the loss function.

6) Computing at each iteration an absolute value of the difference between the position of the determined ith parameter of the loss function of the tth iteration and the position of the ith parameter of the loss function in the t-1th iteration.
7) Iterating until the computed absolute value of the absolute difference computed in step 6) meets a minimum threshold (e.g., less than or equal to a threshold value) that may signal convergence be followed by the stopping of any further iterations.
8) Training a ML connective model such as XGBoost to model the optimal learning rates of the iteratively simulated backpropagation algorithm. The ML connective model may take as inputs an explained variable that is the previously computed and stored optimal learning rates and an explaining variable that may be the corresponding previously computed and stored detachments. According to some embodiments, a learning rate of the ML connective model may be dedicated to different iteratively simulated backpropagation algorithms, the input data type, and the inputted variables, thus tailoring the learning rate of the ML connective model to specific tasks. In embodiments wherein the ML connective model may be XGBoost, the ML connective model may automatically handle missing values. Training may be performed on other models, such as a NN.

According to some embodiments, the dataset in step 2) may correspond to financial transactional data (e.g., transaction amounts, transaction GPS locations, etc.) such that the meta-ML optimization engine may be built to be implemented in to a NN and/or ML connective model that may detect financial fraud. Accordingly, the loss function and parameters thereof corresponding to this dataset may be reflective of the type of data that may make up the data set. For example, the loss function may contain discontinuities, be non-differentiable and/or oscillatory as typically occurs in datasets belonging to the financial domain. Embodiments of the invention may overcome these anomalous characteristics as local minima of the loss function may be determined by analysis of detachments which may, in contrast to signs of the derivative, be defined at such anomalous points of a loss function.

A second example method that implements a meta-ML optimization engine for a NN and/or ML connective model may be performed by a computer processor and proceed, for example, as follows:
1) Receiving raw training data and raw data from a database. Training data may be used to train a NN and/or ML connective model, however, raw training data (e.g., HTTP cookies) may be unprocessed and therefore unsuitable for machine learning. Raw data may be the data on which the trained NN and/or ML connective model performs analysis and makes predictions (e.g., raw target data). Additionally of alternatively, raw data may be used as test data (e.g., a subset of raw target data) by which to test the efficiency of the meta-ML optimization engine. Analogous to raw training data, raw data (e.g., mobile apps data stream) may also be unprocessed and unsuitable for machine learning.
2) Generating training data for training a NN and/or ML connective system and data to which to apply a NN and/or ML connective system by preparing the raw training data and the raw data respectively. According to some embodiments raw training data and/or raw data may be prepared by data cleaning, feature engineering, and/or selection. Data cleaning may comprise identifying and removing and/or modifying and/or replacing corrupted, erroneous and/or irrelevant data. Feature engineering may comprise the identification of features of raw training and/or raw data such as characteristics and/or properties of raw training and/or raw data. These features may then, for examples, be tested on raw training and/or raw data so as to determine how well they perform computational tasks and how to be modified for optimal performance of computational tasks. Selection may comprise selecting a subset of features of a raw training and/or raw data such that a model may be simplified and computational efficiency may be improved.
3) Generating a modified backpropagation algorithm in which algorithmic traits of gradient descent in a backpropagation algorithm such as RProp that uses gradient descent may be replaced with the meta-ML optimization engine. Modification of a backpropagation algorithm may comprise, for example, modifying a section of a code that calls gradient descent to instead call the previously built meta-ML optimization engine as outlined above in the first example algorithm. According to some embodiments. the algorithmic traits of gradient descent to be replaced may be limited to those that only use numerical differentiation.
4) Training the NN and/or ML connective model using the training data and the modified backpropagation algorithm. According to some embodiments, the NN and/or ML connective model may be trained to detect financial fraud. Raw training data may be representative of financial transactions (e.g., transaction amount, merchant name, GPS location of a transaction, etc.) such that after training the NN and/or ML connective system may detect anomalous transactions that may be indicative of financial fraud.
5) Applying the trained NN and/or ML connective model to the data (e.g. NN inference). The data may be representative of financial transactions just as was the training data in step four such that when the trained NN and/or ML connective system may be applied to the data it may detect anomalous transactions that may be indicative of financial fraud.
  According to some embodiments, NN and/or ML connective model trained according to methods discussed herein may be applied to the data to detect financial fraud and correspondingly produce an output such as an alert (e.g., an automated phone call and/or text message).
6) Conducting transfer learning and testing the modified backpropagation algorithm efficiency on other datasets and/or test data (e.g., subset of target data). Transfer learning may comprise re-purposing a NN and/or ML connective model trained to perform a first task (e.g., detecting financial fraud) to perform a second task (e.g., detecting a specific type of financial fraud). In performing the second task all or parts of the initial training of the NN and/or ML connective system may be used, adapted, and/or refined so as to optimize the NN and/or ML connective system to the second task.

A third example method that may use a specific dataset to generate the learning engine and then apply the learning engine to other data sets with similar distribution characteristics may be performed by a computer processor and proceed, for example, as follows:

1) Implementing a variant of a backpropagation algorithm such as RProp wherein the sign of the derivative may be replaced with the detachment over a single set of data.
2) Switching to a meta-learning framework in which a ML connective model such as XGBoost learns the learning rate of the variant of the backpropagation algorithm based on values that were computed in the past iterations of the variant of the backpropagation algorithm: the values of the loss function and the values of the "detachments" (numerical improvements over the derivative sign).
3) Feature engineering the backpropagation algorithm so that it may become an upgraded version of RProp.
4) Implanting the engine in algorithms that may be based on gradient descent such as logistic regression, t-SNE etc. and comparing the results.
5) Conducting transfer learning and testing the algorithm's efficiency on other datasets.

Embodiments of the invention outlined in the above example methods may perform additional or alternative operations; operations may be performed in the same or different order(s), and various operations may be performed in sequence or in parallel.

According to some embodiments of the invention, detachments of higher than first order derivatives (e.g., second, third, etc.) of loss functions and/or leverage optimization algorithms. Embodiments may compute detachments of derivatives of a loss function that may be higher than some threshold (e.g., higher than a first order) to classify the curvature of a loss function so as to better capture local minima of a loss function. For example, a detachment of a loss function at some position or value of a parameter of the loss function may be informative of whether the loss function may be decreasing or increasing; information which may ultimately provide a route to a local minimum. On the other hand, a detachment of a second derivative of a loss function at some position of a parameter of the loss function may be informative of the curvature of the loss function and hence the rate at which the loss function may be increasing or decreasing and correspondingly may provide more detailed information regarding the proximity of a position of a parameter of the loss function to a local minimum of the loss function. Thus, detachments of a loss function paired with detachments of a second derivative of the loss function may provide enhanced efficiency of the capturing of local minima of the loss function.

Higher order derivatives typically may be used in gradient descent computations of local minima of a loss function but the signs of derivatives are typically not used as features for derivatives higher than first order as computational overhead increases with the execution of higher order derivatives. Because detachments are less computationally expensive, as aforementioned, embodiments of the invention may compute detachments of higher order derivatives of a loss function (e.g., greater than a first order) to classify the curvature of a loss function in a coarser and more robust, manner.

Reference is made to FIG. 1, which is a block diagram depicting a computing device, which may be included within an embodiment of a system for executing neural networks and/or ML connective systems, according to some embodiments.

Computing device 1 may include a processor or controller 2 that may be, for example, a central processing unit (CPU) processor, a GPU, a chip or any suitable computing or computational device, an operating system 3, a memory 4, executable code 5, a storage system 6, input devices 7, output devices 8 and memory 9. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention. Methods discussed herein such as those in FIG. 3 and FIG. 4 may be executed by a system such as shown in FIG. 1.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3. Controller 2 may be a multicore processor, e.g. a CPU or GPU, e.g. one chip including a number of cores, each capable of executing a processing thread at the same time other cores in the controller are executing another, possibly different, threat.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may calculate sparse tensor columns for neural networks as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit.

Data pertaining to sparse tensor columns may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a separable keyboard or keypad, a mouse and the like. Output devices 8 may include one or more (possibly separable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
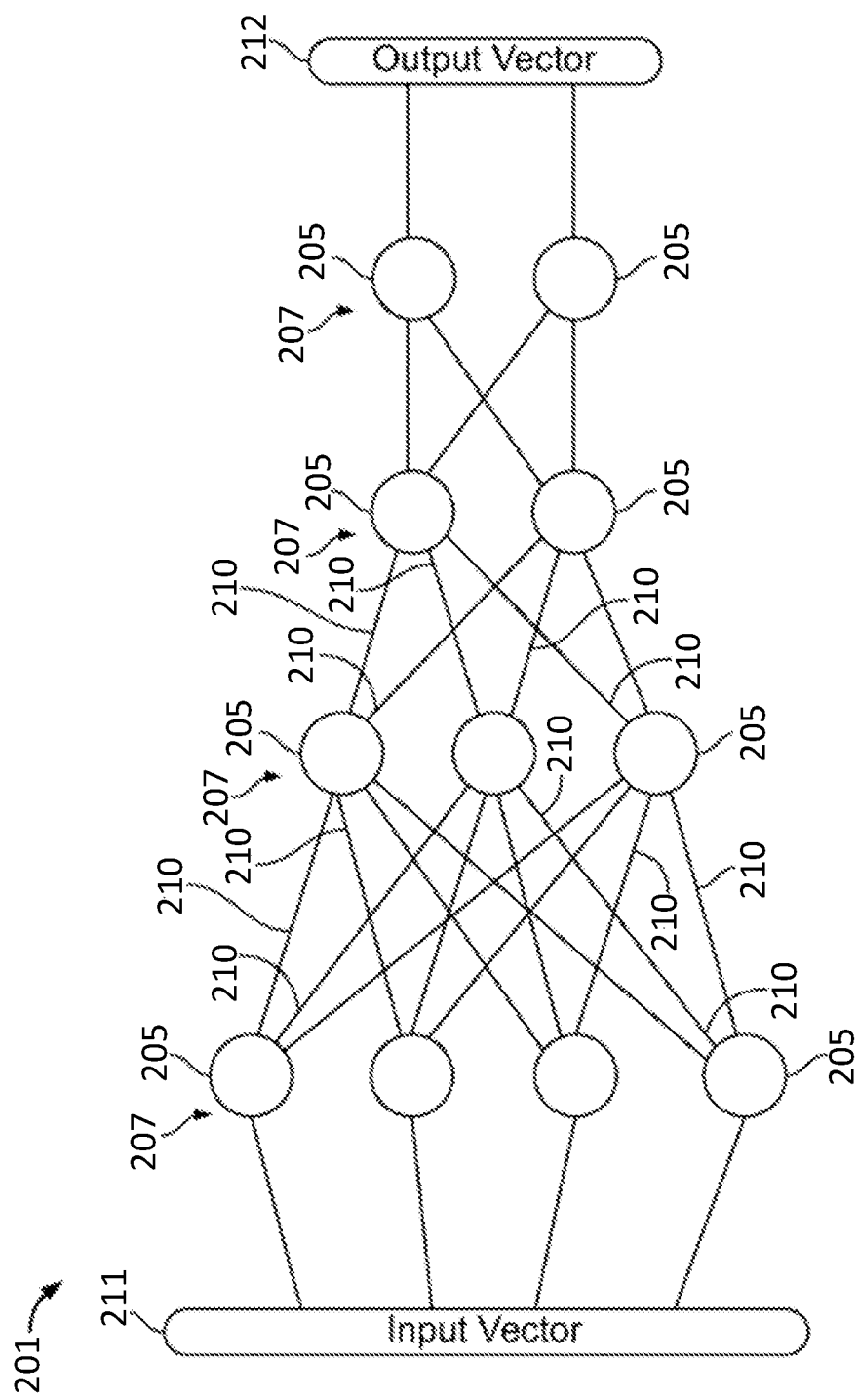
FIG. 2 is a block diagram of a NN according to an embodiment of the present invention.

FIG. 2 is a block diagram of a NN according to an embodiment of the present invention. A NN such as NN 201 which may be operated on or computed according to an embodiment of the present invention typically uses thousands of neurons 205 and links 210. Typically, the operation of NN 201 is simulated by software or code operating on a number of processors or cores (e.g. a system such as shown in FIG. 1); each processor may include more than one core, e.g. 4, 18, etc. NN 201 may input data as for example an input vector 211 of values (representing, e.g. a photograph, voice recording, or any sort of data), and may produce an output of signals or values, for example output vector 212. NN 201 may have neurons arranged into layers 207, each including neurons 205 connected to other neurons by links or edges 210. NN 201 may input data, for example an image (e.g. an input vector, matrix or other data) and may produce an output of signals or values, for example output vector 212, which may for example indicate the content of or a description of the image. Other input data may be analyzed, and other types of NN tasks may be performed. NN 201 may in one example have layers such as convolution, pooling, output layers, an FC layer, softmax layer, etc. Each layer may include neurons connected to other neurons by links or edges. The NN in FIG. 2 is typically simulated, and represented as data, for example by systems such as shown in FIG. 1, using code such as described herein. While specific numbers and types of layers are shown, FIG. 2 is merely a highly generalized example, and NNs used with embodiments of the present invention may vary widely as known in the art. The example NN of FIG. 2, and algorithms described herein, may be implemented by a computer such as shown in FIG. 1.

Figure 3:
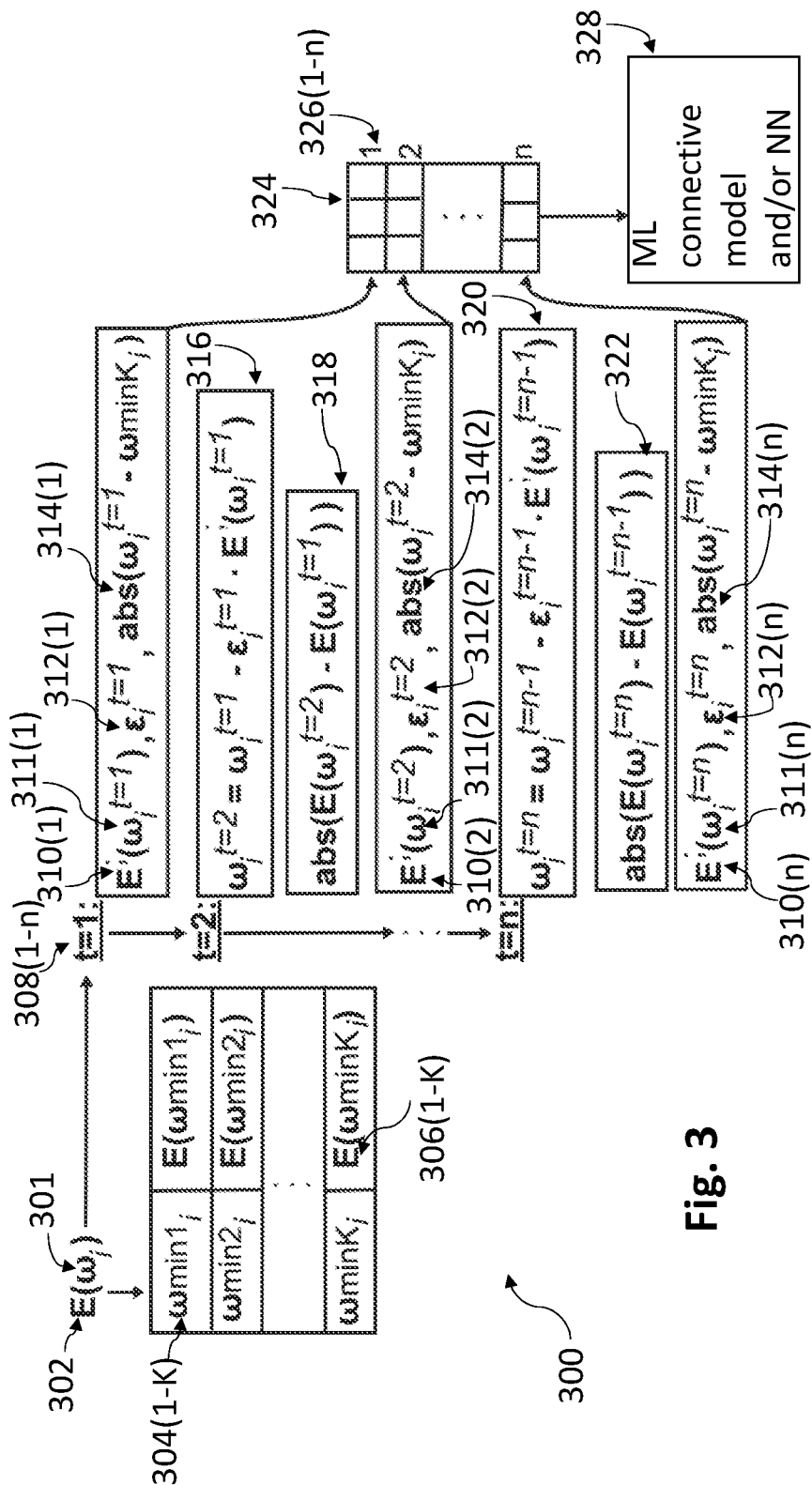
FIG. 3 is a schematic illustration of data structures for iteratively building a meta-ML optimization engine, according to some embodiments of the invention, according to some embodiments of the invention.

Reference is made to FIG. 3, which schematically illustrates data structures for iteratively building a meta-ML optimization engine, according to some embodiments of the invention. In the example method 300 of FIG. 3 embodiments may iteratively compute local minima 304(1-K) and corresponding values 306(1-K) of a loss function 302 of a data set with respect to an ith parameter 301 of the loss function 302 where K may represent the number of local minima of the loss function 302. According to some embodiments, local minima 304(1-K) may be computed by brute force and/or optimization methods.

In a first iteration 308(1) embodiments of the invention may select a position or value of a parameter 311(1) and numerically compute the detachment of the loss function 310(1) at the position of the parameter 311(1). According to some embodiments, the position of the parameter 311(1) may be selected randomly. Further, also in the first iteration 308(1), embodiments may compute a learning rate 312(1) and an absolute value of a difference 314(1) between the position of the selected parameter 311(1) and the position of a local minimum 304(K) of the loss function 302. In the example iterative algorithm of FIG. 2, local minimum 304(K) may be representative of a local minimum that may be nearby the selected parameter 311(1). Any other value of local minima 304(1-K) may be used in this example place of 306(K). Embodiments may store the detachment 310(1), learning rate 312(1), and absolute difference 314(1) in a first row 326(1) of data frame 324 or another suitable data structure.

In a second iteration 308(2) a variant of the backpropagation algorithm RProp that uses a detachment operator in place of a derivative operator may be simulated by computing an optimization step 316. Other backpropagation algorithms may be used. Optimization step 316 may be the computation of a parameter 311(2) of the loss function 302 that may be closer than the selected parameter 311(1) of the loss function 301. Further, also in the second iteration 308(2), embodiments may compute the absolute value of the difference 318 between the value of the loss function in the second iteration 308(2) and the value of the loss function in the previous first iteration 308(1). This absolute difference 318 may serve as a convergence test such that the absolute difference 318 equaling a value less than or equal to some threshold may signal that a local minimum has been captured and result in the termination of iterations. Further, also in second iteration 308(2), embodiments may compute a learning rate 212(2) and an absolute value of a difference 314(2) between the position of the computed parameter 311(2) and the position of a local minimum 304(K) of the loss function 202. The absolute difference 214(2) may be representative of an optimal learning rate; that is the optimum optimization step that could have been take in the second iteration 308(2). Embodiments may store the detachment 310(2), learning rate 312(2), and optimal learning rate 314(2) in a second row 326(2) of data frame 324.

Further iterations may proceed in the same fashion as the second iteration 308(2) until a final nth iteration 308(n). Together, iterations 308(1-n) may comprise a sequence of optimization steps. In the final nth iteration 308(n) embodiments may compute optimization step 220, learning rate 312(n), the nth optimal learning rate 314(n). According to some embodiments, one or more optimal learning rates corresponding to one or more local minima 304(1-K) of loss function 302 may be computed and stored in data frame 324. Method 300 may terminate at the nth iteration due to the signaling of convergence as outlined above in the second iteration 308(2) as per the computation of the absolute value of the difference 322 between the value of the loss function in the nth iteration 308(n) and the value of the loss function in the previous n-1th iteration 208(n-1). Additionally or alternatively, method 300 may otherwise be terminated (e.g., automatically and/or manually). Embodiments may store the detachment 310(n), learning rate 312(n), and optimal learning rate 314(n) in a nth row 326(n) of data frame 324.

According to some embodiments, data frame 324 may be input into a NN (e.g., 201 of FIG. 2) and/or ML connective model 328 such as XGBoost. ML connective model 328 may accept optimal learning rates 314(1-n) as an explained variable and detachments 310(1-n) as an explaining variable and model optimal learning rates 314(1-n). According to some embodiments, meta learning of the ML connective model 328 may be incrementally conducted such that batches of meta-data which may comprise partial and/or subsets of meta-data accumulated by the iteratively simulated backpropagation algorithm may be incrementally input into ML connective model 328. For example, initial meta-data (e.g., 326(1-3)) accumulated in initial iterations (e.g., 308(1-3)) of the iteratively simulated backpropagation algorithm may initiate before the nth final iteration 308(n) the training of ML connective model 328 and accordingly the learning rate of the ML connective model may be updated. Then, the learning rate of the ML connective model 328 may repeatedly be updated based on incremental batches (e.g., 326(4-6), 326(7-11), etc.).

Embodiments of the invention may use different aggregated sequences of detachments values as features of the ML connective system. For example, consider the case in which there may be ten iterations 308(1-10) of which the detachment values 310(1-10) may include for example:

{−1, −1, −1, −1, +1, +1, −1, −1, +1. −1}.

Consecutive identical detachments may be collected into respective features and feature engineered as in the following example:

{−1, −1, −1, −1}, {+1, +1}, {−1, −1}, {+1}, {−1}.

Accordingly, these new features may be stored in data frame 324 along with detachments 310(1-10), learning rates 312 (1-10), and 314(1-10) and input into ML connective model 328 and used as an explaining variable in ML connective model 328 for a more refined modeling of the optimal learning rates 314(1-10).

The example data structures of FIG. 3, and methods described herein, may be implemented by a computer such as shown in FIG. 1 or another system.

Figure 4:
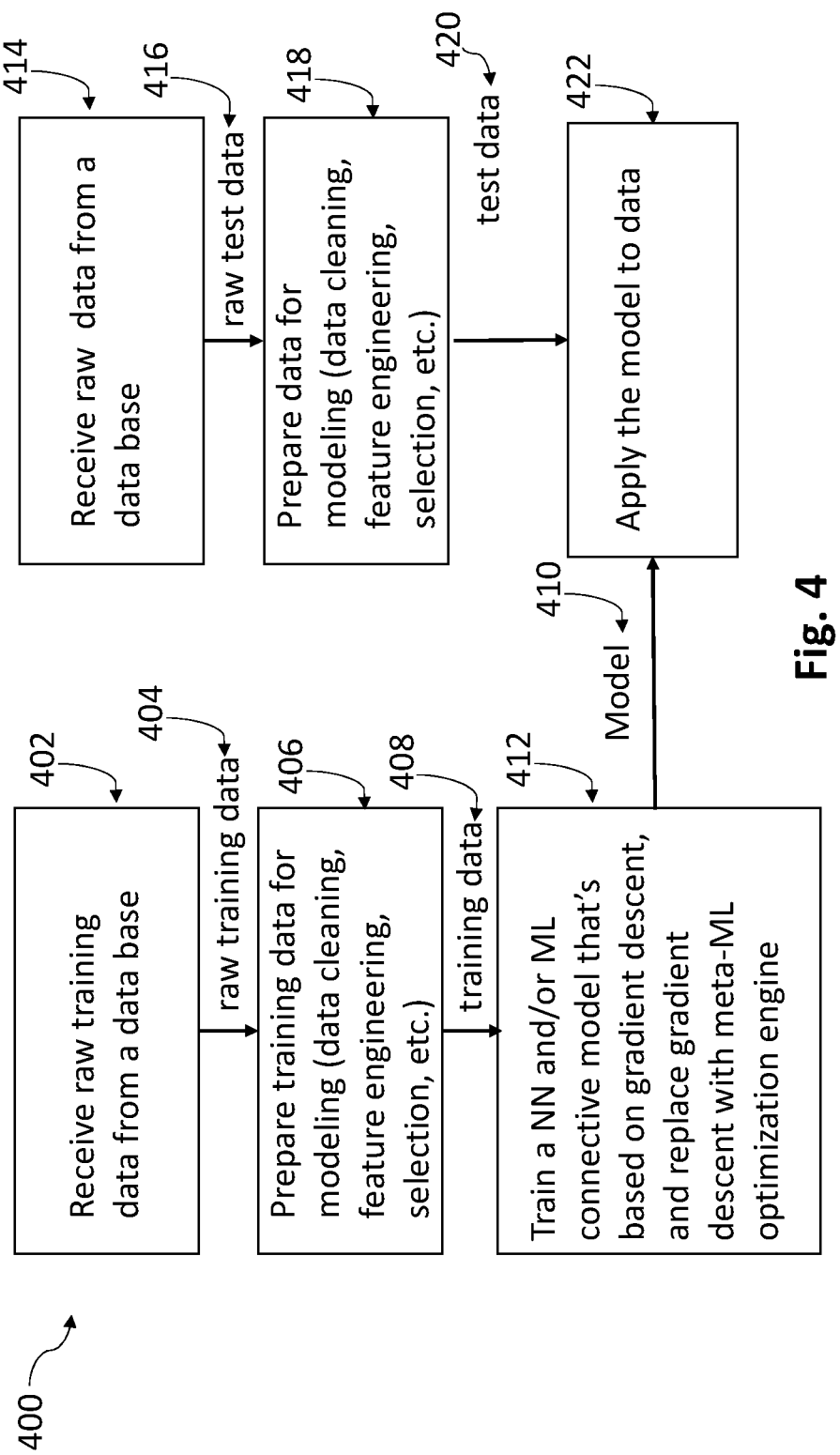
FIG. 4 is a schematic illustration of an example method for implementing a meta-ML optimization engine for a NN and/or ML connective model that uses gradient descent, according to some embodiments of the invention.

Reference is made to FIG. 4, which schematically illustrates an example method 400 for implementing a meta-ML optimization engine for a NN and/or ML connective model that uses gradient descent, according to some embodiments of the invention. In a first step which may comprise two parallel actions 402 and 414 embodiments of the invention may receive raw training data 404 and raw data 416 respectively from a data base. In a second step which may comprise two parallel actions 406 and 418 embodiments of the invention may prepare raw training data 404 and raw data 416 respectively (e.g., data cleaning, feature engineering, selection, etc.) to generate data for modeling 408 and data 420 respectively. In a third step 412 embodiments of the invention may replace algorithmic traits of gradient descent in backpropagation algorithms that use gradient descent and may be used by a NN and/or ML connective model to generate a modified backpropagation algorithm and then train the NN and/or ML connective system using the data for modeling and the modified backpropagation algorithm. In a fourth step 422 the trained NN and/or ML connective system 410 may be applied to data 420. The example algorithm of FIG. 3, and other algorithms described herein, may be implemented by a computer such as shown in FIG. 1.

Figure 5:
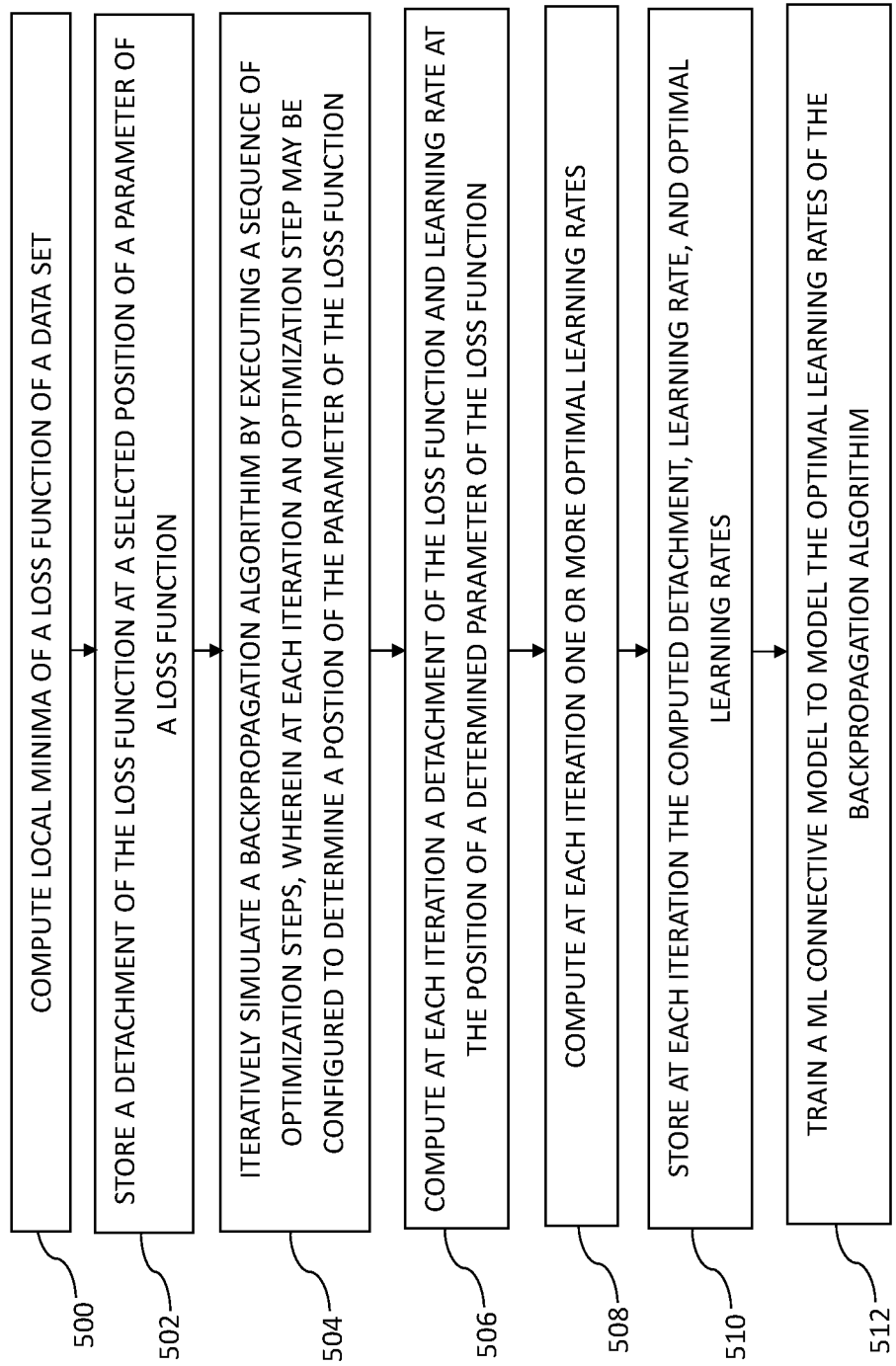
FIG. 5 is a flow chart of a method for building a meta-ML optimization engine for a NN and/or ML connective model, according to some embodiments of the invention.

Reference is made to FIG. 5, which is a flow chart of a method for building a meta-ML optimization engine for a NN and/or ML connective model, according to some embodiments of the invention. The operations of FIG. 5 may be performed by a system as depicted in FIG. 1, and may incorporate operations and data structures as depicted in FIGS. 2, 3, and 4 but may be carried out by other systems and incorporate other operations.

In operation 500, one or more processors may compute local minima (e.g., 306(1-K) of FIG. 3) of a loss function (e.g., 302 of FIG. 3) for a data set. According to some embodiments, a data set may describe financial transactions (e.g., transaction amounts, GPS transaction location, etc.) for detecting fraud, audio for voice recognition and/or voice authentication and/or images for image classification; essentially any data that can be modeled with a NN.

In operation 502, one or more processors may store a detachment of the loss function (e.g., 310(1) of FIG. 3) at a selected position or value of a parameter (e.g., 311(1)) of the loss function. According to some embodiments, the selected position of the parameter of the loss function may be selected randomly. According to some embodiments, a detachment may be stored in a data frame (e.g., 324 of FIG. 3)

In operation 504, one or more processors may iteratively simulate a backpropagation algorithm by executing a sequence of optimization steps, wherein at each iteration an optimization step may be configured to determine a position of a parameter of the loss function (e.g., 316 of FIG. 3) that may be closer than the selected position of the parameter of the loss function or a previous position of the parameter of the loss function determined in a previous iteration to a local minimum of the loss function. According to some embodiments, one or more processors may compute at each iteration an absolute value of the difference between the position of a determined parameter of the loss function and the position of a determined parameter of the loss function in a previous iteration (e.g., 318 and 322 of FIG. 3). Accordingly, one or more processors may iteratively simulate the backpropagation algorithm until the absolute value of the difference between the position of a determined parameter of the loss function and the position of the determined parameter of the loss function in a previous iteration satisfies a minimum threshold and then stops iteratively simulating the backpropagation algorithm.

According to some embodiments, the backpropagation algorithm may be a variant of RProp that uses a detachment operator in place of a derivative operator. For example, RProp and/or other trend-based backpropagation algorithms typically use the sign of the derivative and/or the derivative of a loss function to determine local minima of a loss function and as aforementioned these algorithms may be limited by a derivative not being defined at anomalous points of a loss function (e.g., non-differentiable, discontinuous, and/or oscillatory points). Accordingly, embodiments of the invention may use the detachment in place of the sign of the derivative and/or derivative of a loss function to produce a variant of RProp and/or other trend-based backpropagation algorithms to determine local minima of the loss function. By virtue of the detachment being defined at anomalous points of a loss function, variants of these algorithms, as according to some embodiments of the invention, may overcome aforementioned limitations regarding anomalous points of a loss function. According to some embodiments, one or more processors may iteratively simulate the backpropagation algorithm by using a Monte Carlo method; however other simulations may be used.

In operation 506, one or more processors may compute at each iteration a detachment (e.g., 310(1-n) of FIG. 3) of the loss function and learning rate (e.g., 312(1-n) of FIG. 3) at the position of a determined parameter (e.g., 312 of FIG. 3) of the loss function.

In operation 508, one or more processors may compute at each iteration one or more optimal learning rates (e.g., 314(1-n) of FIG. 3), wherein an optimal learning rate may include an absolute value of a difference between the position of a determined parameter of the loss function (e.g., 314(2) of FIG. 3) and the position of a local minimum of the loss function (e.g., 304(1-K) of FIG. 3).

In operation 510, one or more processors may store (e.g., 324 of FIG. 3) after each iteration the computed detachment, learning rate, and optimal learning rates. According to some embodiments, one or more processors may collect into respective features of the ML connective model tuples of consecutive identical detachments, where a tuple may comprise a row of numbers. Accordingly, if a dimensionality of the tuple may be greater than or equal to a threshold an explained variable of the ML connective model may be explored and if the dimensionality of the tuple may be less than a threshold the explained variable of the ML connective model may be exploited.

In operation 512, one or more processors may train a ML connective model (e.g., 328 of FIG. 3) to model the optimal learning rates of the backpropagation algorithm. According to some embodiments, the ML connective model may comprise an explained variable that may be the optimal learning rates and an explaining variable that may be the corresponding detachments. According to some embodiments, the ML connective model may be XGBoost. According to some embodiments, one or more processors may train the ML connective model incrementally such that the learning rate of the ML connective model may be initialized and repeatedly updated by batches of meta-data accumulated by the backpropagation algorithm. Other or different operations may be used.

Figure 6:
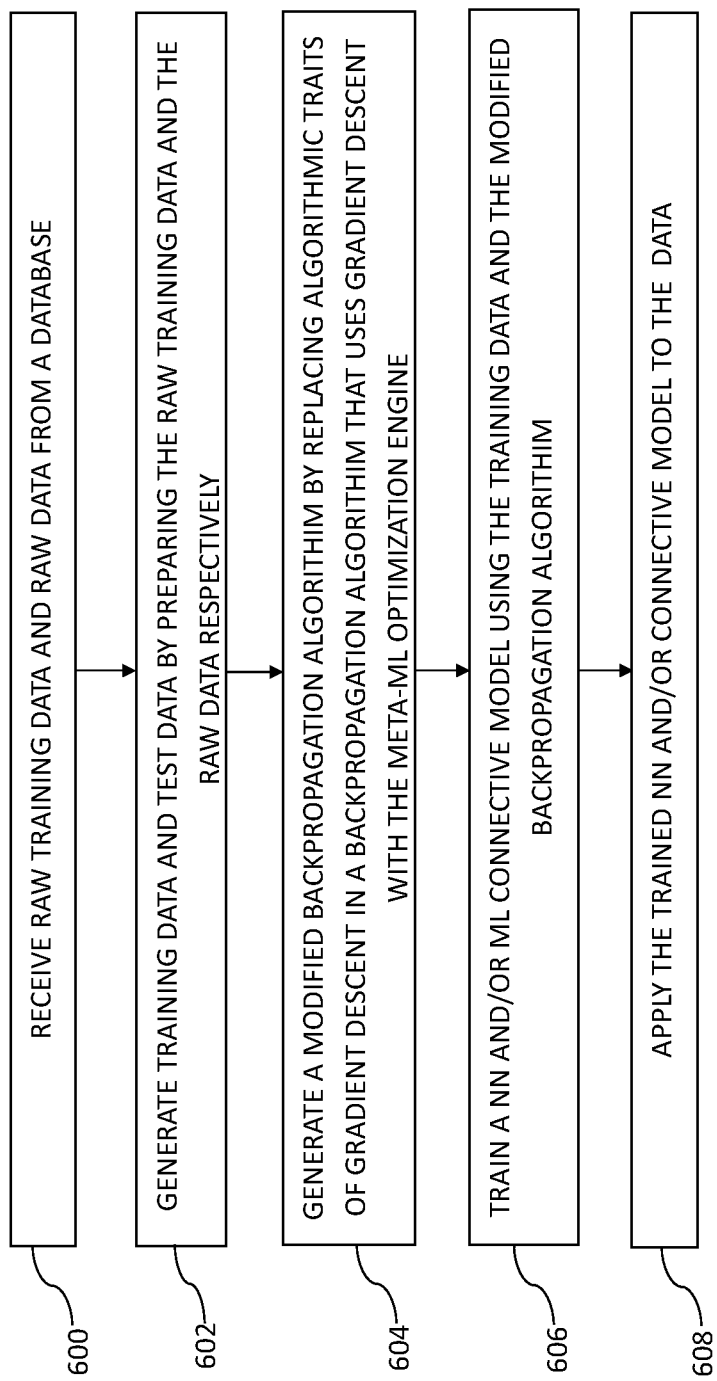
FIG. 6 is a flow chart of a method for implementing a meta-ML optimization engine for a NN and/or a ML connective model, according to some embodiments of the invention.

Reference is made to FIG. 6, which is a flow chart of a method for implementing a meta-ML optimization engine for a NN and/or a ML connective model, according to some embodiments of the invention. The operations of FIG. 6 may be performed by a system as depicted in FIG. 1, and may incorporate operations and data structures as depicted in FIGS. 2, 3, and 4 but may be carried out by other systems and incorporate other operations.

In operation 600, one or more processors may receive raw training data (e.g., 404 of FIG. 4) and raw data (e.g., 416 of FIG. 4) from a database.

In operation 602, one or more processors may generate training data (e.g., 408 of FIG. 4) and data (e.g., 420 of FIG. 4) by preparing the raw training data and the raw data respectively.

In operation 604, one or more processors may generate a modified backpropagation algorithm by replacing algorithmic traits of gradient descent in a backpropagation algorithm that uses gradient descent with the meta-ML optimization engine (e.g., modifying section of a code that calls gradient descent to instead call the previously built meta-ML optimization engine). According to some embodiments, the algorithmic traits of gradient descent may be limited to those that only use numerical differentiation.

In operation 606, one or more processors may train the NN and/or ML connective model using the training data and the modified backpropagation algorithm. According to some embodiments, one or more processors may train the NN and/or ML connective model to detect financial fraud.

In operation 608, one or more processors may apply the trained NN and/or ML connective model to the data (e.g. NN inference). According to some embodiments, a NN and/or ML connective model trained to detect financial fraud may be applied to the data and if fraud may be detected one or more processors may generate an alert (e.g., automated phone call and/or text message to a victim of said fraud). Other types of training data in other domains may be used.

Other operations or series of operations may be used.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for building a meta-machine learning (meta-ML) optimization engine for a neural network (NN) or a machine learning (ML) connective model, the method comprising using a computer processor:
    computing local minima of a loss function for a data set;
    storing a detachment of the loss function at a selected position of a parameter of the loss function;
    iteratively simulating a backpropagation algorithm by executing a sequence of optimization steps, wherein at each iteration an optimization step is configured to determine a position of a parameter of the loss function that is closer than the selected position of the parameter of the loss function or a position of the parameter of the loss function determined in a previous iteration to a local minimum of the loss function, wherein the simulated backpropagation algorithm avoids calculating a derivative of the loss function;
    computing at each iteration a detachment of the loss function and learning rate at the position of a determined parameter of the loss function;
    computing at each iteration one or more optimal learning rates, wherein an optimal learning rate comprises an absolute value of a difference between the position of a determined parameter of the loss function and the position of a local minimum of the loss function, wherein the local minimum of the loss function is determined by an analysis of detachments;
    storing after each iteration the computed detachment, learning rate, and optimal learning rates;
    using one or more of the stored detachments as an explaining variable in the simulated backpropagation algorithm; and
    training a ML connective model to model the optimal learning rates of the simulated backpropagation algorithm, wherein the training is initiated before a termination of the simulated backpropagation algorithm, wherein the training is based on data accumulated in one or more iterations of the simulated backpropagation algorithm, and wherein the training comprises incrementally updating a learning rate of the ML connective model based on batches of the stored learning rates from the simulated backpropagation algorithm.

2. The method of claim 1 comprising: computing at each iteration an absolute value of the difference between the position of a determined parameter of the loss function and the position of a determined parameter of the loss function in a previous iteration.

3. The method of claim 2 comprising: iteratively simulating the backpropagation algorithm until the absolute value of the difference between the position of a determined parameter of the loss function and the position of the determined parameter of the loss function in a previous iteration satisfies a minimum threshold.

4. The method of claim 1 wherein the backpropagation algorithm is a variant of RProp that uses a detachment operator in place of a derivative operator.

5. The method of claim 1 wherein the selected position of the parameter of the loss function is selected randomly.

6. The method of claim 1 wherein the backpropagation algorithm is iteratively simulated by a Monte Carlo method.

7. The method of claim 1 wherein the ML connective model is XGBoost.

8. The method of claim 1 comprising: collecting into respective features of the ML connective model tuples of consecutive identical detachments,
   wherein if a dimensionality of the tuple is equal to or greater than a threshold an explained variable of the ML connective model is explored; and
   wherein if the dimensionality of the tuple is less than the threshold the explained variable of the ML connective model is exploited.

9. A method for implementing a meta-machine learning (meta-ML) optimization engine for a neural network (NN) or a machine learning (ML) connective model, the method comprising using a computer processor:
   generating training data and data by preparing raw training data and raw data;
   generating a modified backpropagation algorithm by replacing algorithmic traits of gradient descent in a backpropagation algorithm that uses gradient descent with the meta-ML optimization engine, wherein the modified backpropagation algorithm comprises:
      computing at each iteration a detachment of a loss function and learning rate at a position of a determined parameter of the loss function a plurality of iterations, wherein the modified backpropagation algorithm avoids calculating a derivative of the loss function; and
      computing at each iteration one or more optimal learning rates, wherein an optimal learning rate comprises an absolute value of a difference between the position of a determined parameter of the loss function and the position of a local minimum of the loss function, wherein the local minimum of the loss function is determined by an analysis of detachments;
      wherein one or more of the detachments are used as an explaining variable in the modified backpropagation algorithm;
   training the NN or ML connective model using training data and the modified backpropagation algorithm, wherein the training is initiated before a termination of the modified backpropagation algorithm, wherein the training is based on data accumulated in one or more iterations of the modified backpropagation algorithm, and wherein the training comprises incrementally updating a learning rate of the NN or ML connective model based on batches of the computed learning rates from the modified backpropagation algorithm; and
   applying the trained NN or ML connective model to data.

10. The method of claim 9 wherein the algorithmic traits of gradient descent only use numerical differentiation.

11. The method of claim 9 comprising: training the NN or ML connective model to detect financial fraud.

12. A system for building a meta-machine learning (meta-ML) optimization engine for a neural network (NN) or a machine learning (ML) connective model, the system comprising:
   a memory; and
   one or more processors configured to:
   compute local minima of a loss function for a data set;
   store a detachment of the loss function at a selected position of a parameter of the loss function;
   iteratively simulate a backpropagation algorithm by executing a sequence of optimization steps, wherein at each iteration an optimization step is configured to determine a position of a parameter of the loss function that is closer than the selected position of the parameter of the loss function or a position of the parameter of the loss function determined in a previous iteration to a local minimum of the loss function, wherein the simulated backpropagation algorithm avoids calculating a derivative of the loss function;
   compute at each iteration a detachment of the loss function and learning rate at the position of a determined parameter of the loss function;
   compute at each iteration one or more optimal learning rates, wherein an optimal learning rate comprises an absolute value of a difference between the position of a determined parameter of the loss function and the position of a local minimum of the loss function, wherein the local minimum of the loss function is determined by an analysis of detachments;
   store after each iteration the computed detachment, learning rate, and optimal learning rates;
   use one or more of the stored detachments as an explaining variable in the simulated backpropagation algorithm; and
   train a ML connective model to model the optimal learning rates of the simulated backpropagation algorithm, wherein the training is initiated before a termination of the simulated backpropagation algorithm, wherein the training is based on data accumulated in one or more iterations of the simulated backpropagation algorithm, and wherein the training comprises incrementally updating a learning rate of the ML connective model based on batches of the stored learning rates from the simulated backpropagation algorithm.

13. The system of claim 12 wherein the one or more processors are configured to compute at each iteration an absolute value of the difference between the position of a determined parameter of the loss function and the position of a determined parameter of the loss function in a previous iteration.

14. The system of claim 13 wherein the one or more processors are configured to iteratively simulate the backpropagation algorithm until the absolute value of the difference between the position of a determined parameter of the loss function and the position of the determined parameter of the loss function in a previous iteration satisfies a minimum threshold.

15. The system of claim 12 wherein the backpropagation algorithm is a variant of RProp that uses a detachment operator in place of a derivative operator.

16. The system of claim 12 wherein the selected position of the parameter of the loss function is selected randomly.

17. The system of claim 12 wherein the one or more processors are configured to iteratively simulate the backpropagation algorithm by using a Monte Carlo method.

18. The system of claim 12 wherein the ML connective model is XGBoost.

19. The system of claim 12 wherein the one or more processors are configured to collect into respective features of the ML connective model tuples of consecutive identical detachments,
- wherein if a dimensionality of the tuple is greater than or equal to a threshold an explained variable of the ML connective model is explored; and
- wherein if the dimensionality of the tuple is less than the threshold the explained variable of the ML connective model is exploited.

20. A system for implementing a meta-machine learning (meta-ML) optimization engine for a neural network (NN) or a machine learning (ML) connective model, the system comprising:
- a memory; and
- one or more processors configured to:
- generate training data and data by preparing raw training data and raw data;
- generate a modified backpropagation algorithm by replacing algorithmic traits of gradient descent in a backpropagation algorithm that uses gradient descent with the meta-ML optimization engine, wherein the modified backpropagation algorithm comprises:
  - computing at each iteration a detachment of a loss function and learning rate at a position of a determined parameter of the loss function a plurality of iterations, wherein the modified backpropagation algorithm avoids calculating a derivative of the loss function; and
  - computing at each iteration one or more optimal learning rates, wherein an optimal learning rate comprises an absolute value of a difference between the position of a determined parameter of the loss function and the position of a local minimum of the loss function, wherein the local minimum of the loss function is determined by an analysis of detachments;
  - wherein one or more of the detachments are used as an explaining variable in the modified backpropagation algorithm;
- train the NN or ML connective model using the training data and the modified backpropagation algorithm, wherein the training is initiated before a termination of the modified backpropagation algorithm, wherein the training is based on data accumulated in one or more iterations of the modified backpropagation algorithm, and wherein the training comprises incrementally updating a learning rate of the NN or ML connective model based on batches of the computed learning rates from the modified backpropagation algorithm; and
- apply the trained NN or ML connective model to the data.

21. The system of claim 20 wherein the algorithmic traits of gradient descent only use numerical differentiation.

22. The system of claim 20 wherein the one or more processors are configured to train the NN or ML connective model to detect financial fraud.

* * * * *